US005514645A

United States Patent [19]
McCabe et al.

[11] Patent Number: 5,514,645
[45] Date of Patent: May 7, 1996

[54] METHOD OF GELLING HYDROCARBONS AND FRACTURING SUBTERRANEAN FORMATIONS

[75] Inventors: Michael A. McCabe; Lewis R. Norman; James R. Stanford, all of Duncan, Okla.

[73] Assignee: Halliburton Company, Duncan, Okla.

[21] Appl. No.: 75,829

[22] Filed: Jun. 11, 1993

Related U.S. Application Data

[63] Continuation-in-part of Ser. No. 817,565, Jan. 7, 1992, abandoned.

[51] Int. Cl.⁶ .................................................. E21B 43/26
[52] U.S. Cl. ........................... 507/238; 507/239; 507/245; 507/271; 507/922; 507/235; 252/315.1; 44/268
[58] Field of Search ................................ 507/235, 238, 507/239, 242, 244, 245, 266, 268, 269, 271, 922; 252/315.1; 44/268

[56] References Cited

U.S. PATENT DOCUMENTS

| | | |
|---|---|---|
| 3,334,978 | 8/1967 | Revukas. |
| 3,494,949 | 2/1970 | Monroe. |
| 3,505,374 | 4/1970 | Monroe. |
| 3,575,859 | 4/1971 | Monroe. |
| 3,757,864 | 9/1973 | Crawford et al.. |
| 3,990,978 | 11/1976 | Hill. |
| 4,007,128 | 2/1977 | Poklacki. |
| 4,031,014 | 6/1977 | Griffin, Jr.. |
| 4,104,173 | 8/1978 | Gay et al.. |
| 4,152,289 | 5/1979 | Griffin, Jr.. |
| 4,153,066 | 5/1979 | Griffin, Jr.. |
| 4,153,649 | 8/1979 | Griffin, Jr.. |
| 4,174,283 | 11/1979 | Griffin, Jr.. |
| 4,200,539 | 4/1980 | Burnham et al.. |
| 4,200,540 | 4/1980 | Burnham. |
| 4,316,810 | 2/1982 | Burnham. |
| 4,473,408 | 9/1984 | Purinton, Jr.. |
| 4,507,213 | 3/1985 | Daccord et al.. |
| 4,537,700 | 8/1985 | Purinton, Jr.. |
| 4,622,155 | 11/1986 | Harris et al.. |
| 4,781,845 | 11/1988 | Syrinek et al.. |
| 4,787,994 | 11/1988 | Thorne et al.. |
| 5,057,233 | 10/1991 | Huddleston. |
| 5,110,485 | 5/1992 | Huddleston. |
| 5,190,675 | 3/1993 | Gross ..................... 252/315.1 |
| 5,202,035 | 4/1993 | Huddleston ............... 166/283 |

FOREIGN PATENT DOCUMENTS 0225661  6/1987  European Pat. Off..

OTHER PUBLICATIONS

SPE 21859... "An Improved Gelled Oil System For High–Temperature Fracturing Applications" D. Cramer et al Apr. 1991.
ACS Symposium Series 396 . . Oil Field Chemistry "Enhanced Recovery And Production Stimulation".

Primary Examiner—Philip Tucker
Assistant Examiner—Joseph D. Anthony
Attorney, Agent, or Firm—Robert A. Kent

[57] ABSTRACT

The present invention provides a method of treating a subterranean formation by rapidly viscosifying a normally liquid hydrocarbon. The method is accomplished by admixing (i) an alkyl orthophosphate acid ester and (ii) an alkali metal hydroxide present in an amount sufficient to at least partially neutralize said ester and (iii) a reaction product resulting from the reaction of a source of aluminum or ferric ions with a $C_8$–$C_{18}$ surface active amine solubilized in the presence of an organic solvent such as a $C_2$–$C_4$ monohydric alcohol with the normally liquid hydrocarbon. The mixture rapidly viscosifies to a level sufficient to transport proppant and then can be introduced into a subterranean formation to treat the formation in a desired manner.

20 Claims, 3 Drawing Sheets

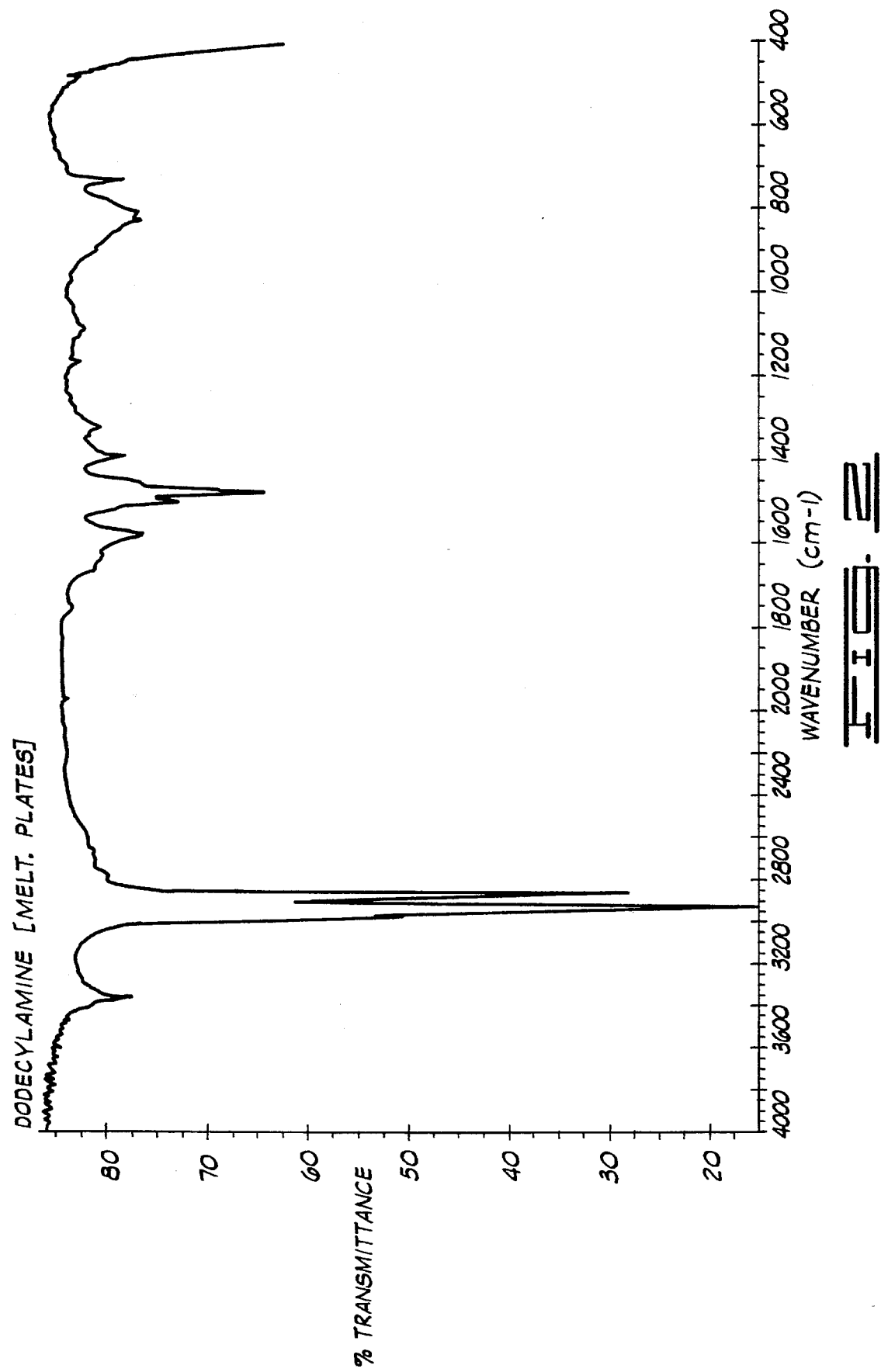

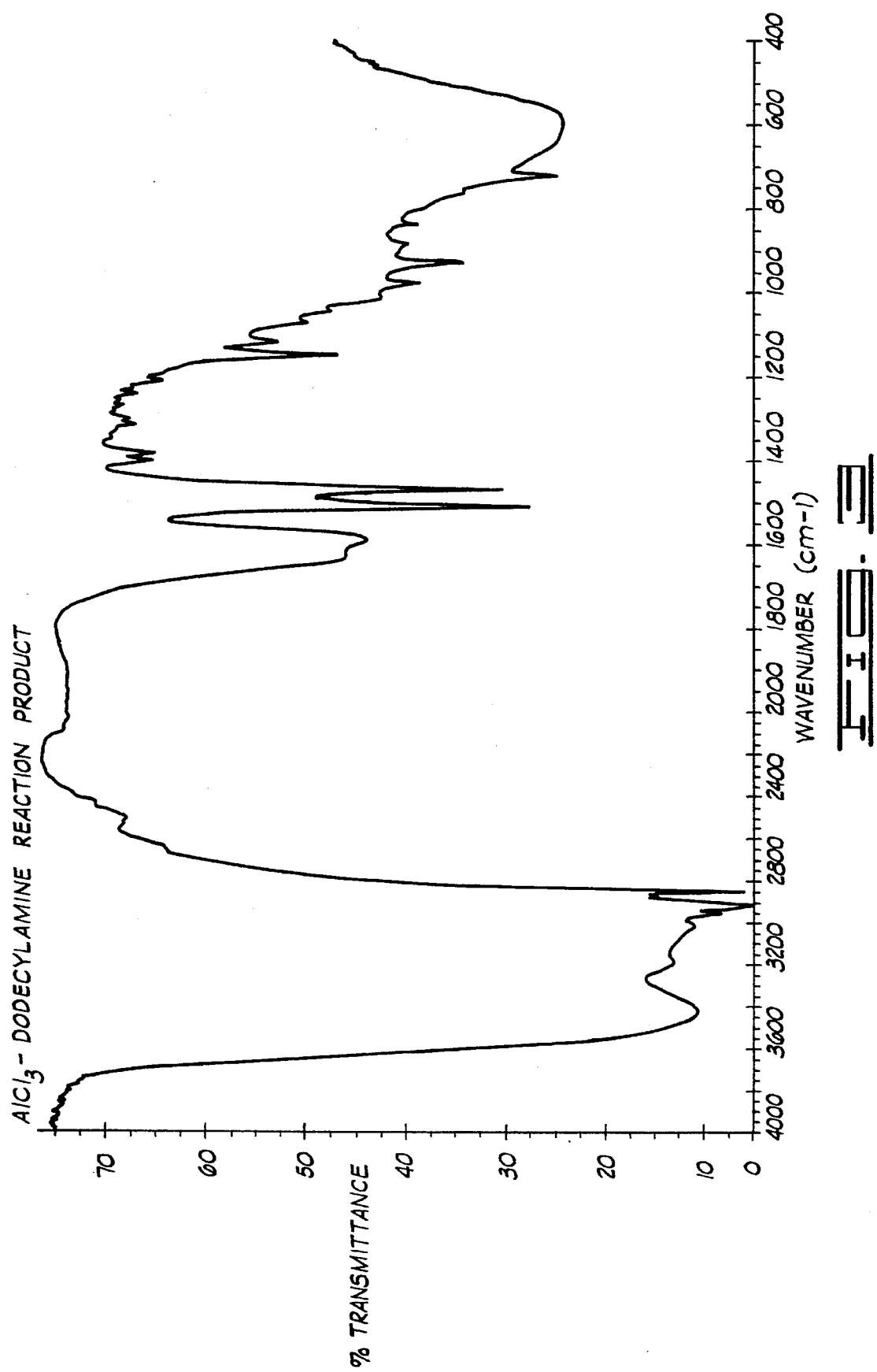

METHOD OF GELLING HYDROCARBONS AND FRACTURING SUBTERRANEAN FORMATIONS

CROSS REFERENCE TO RELATED APPLICATION

The present Application is a Continuation-in-part of application Ser. No. 817,565, filed Jan. 7, 1992, now abandoned.

BACKGROUND OF THE INVENTION

1. Field of the Invention

The invention relates to methods of rapidly gelling hydrocarbons and the use of such gelled hydrocarbons to fracture subterranean formations to enhance oil and/or gas production therefrom.

2. Prior Art

Hydraulic fracturing is a widely used method for stimulating hydrocarbon producing subterranean formations. Fracturing commonly is performed by contacting a subterranean formation with a viscous fracturing fluid having propping agents therein, applying sufficient pressure to the viscous fluid to open at least one fracture in the formation and maintaining sufficient pressure upon said formation to inject the viscous fluid into the created fracture at a sufficient rate to extend the fracture into the formation. When the pressure upon the fluid is subsequently reduced, the propping agent prevents the complete closure of the created fracture.

Compositions containing gelled hydrocarbons often are used to achieve formation fracturing when water sensitive layers exist in the formation. The gelling of hydrocarbons and the use of gelled hydrocarbons in fracturing has been described in numerous patents, for example: U.S. Pat. Nos. 3,757,864; 3,575,859; 4,007,128; 4,200,540; 4,507,213 and U.S. Pat. Nos. 4,622,155 and 5,110,485. The gelling process outlined in the prior art can be outlined as follows: A tri-dimensional polymer is created by the reaction of an orthophosphoric acid ester with an aluminum salt and optionally a base to result in neutralization of the aluminum orthophosphate salt. Various methods have been proposed to yield the viscosifying polymer; however, each method fails to provide a means by which a gelled hydrocarbon may be rapidly prepared, without any significant aging period at ambient temperature to permit viscosity to develop, to facilitate "on the fly" gelation of just those quantities of gelled fluid actually needed for a fracturing treatment.

SUMMARY OF THE INVENTION

The present invention provides a method by which a hydrocarbon fluid may be rapidly gelled to a viscosity sufficiently high to facilitate transport of a propping agent and achieve fracture creation and extension in a subterranean formation. In a preferred embodiment, an alkyl orthophosphate acid ester prepared by the well known methods is admixed with a quantity of an alkali metal hydroxide whereby the ester is partially neutralized to form a first component. A second component is prepared by reacting a soluble source of aluminum or ferric ions with a $C_8$–$C_{18}$ surface active amine to form a reaction product to which is added a $C_2$–$C_4$ monohydric alcohol which functions to solubilize the reaction product. A hydrocarbon fluid such as diesel or crude oil may be gelled by admixing simultaneously or sequentially in any order quantities of the two components and a quantity of the hydrocarbon. The hydrocarbon rapidly develops sufficient viscosity to transport a propping agent without the necessity of any "aging" period before use. Alternatively, the alkyl orthophosate ester and alkali metal hydroxide may be individually added to the hydrocarbon either sequentially or simultaneous in any order with the mixture comprising the second component.

BRIEF DESCRIPTION OF THE DRAWINGS

FIG. 2 is an FT-IR Spectra generated from the dodecylamine reactant.

FIG. 3 is an FT-IR Spectra generated by testing of a reaction product from the reaction of aluminum chloride and dodecylamine.

DESCRIPTION OF THE PREFERRED EMBODIMENT

Figure 1:
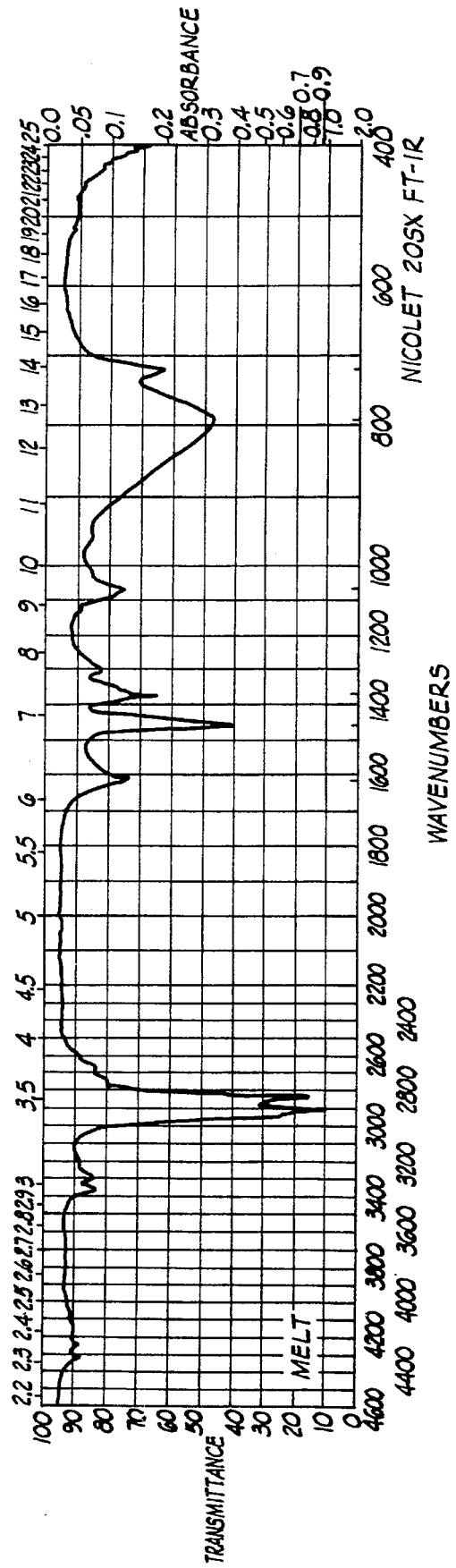
FIG. 1 is an FT-IR Spectra for Dodecylamine from The Aldrich Library of FT-IR Spectra, Edition I.

In accordance with the present invention, a novel gelling system is provided which can viscosify a hydrocarbon to a viscosity of at least about 4000 centipoise in less than about 30 seconds as measured by a Brookfield® Synchro-lectric Viscometer Model LTV, using a #3 spindle rotating at 12 rpm at ambient temperature when added at a concentration of 0.5% by volume. The liquid hydrocarbons that can be gelled by the present invention include crude oil, kerosene, diesel, gasoline and other aliphatic or aromatic hydrocarbons such as octane, heptane, lubricating oils and the like. In a preferred embodiment, the hydrocarbon is gelled by the addition of two components to the liquid hydrocarbon while the liquid is mixed or otherwise agitated. The first component preferably comprises an alkyl orthophosphate acid ester which is admixed with a quantity of an alkali metal hydroxide whereby the ester is partially neutralized. The alkyl orthophosphate esters are characterized according to the formula:

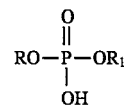

wherein R is an alkyl radical having from about 6 to 18 carbon atoms and $R_1$ is an alkyl having from about 2 to 4 carbon atoms. The orthophosphate also may comprise a mixture of different compounds. Preferably R has an average value of from about 8 to 10 carbon atoms and $R_1$ is ethyl. The alkylorthophosphate ester may be prepared by any of the well known methods, such as those disclosed in U.S. Pat. No. 3,757,864, which is incorporated herein by reference. Such compounds are available from manufactures such as Witco Chemical Company, Houston Tex.; Nalco Chemical Company, Sugar Land Tex.; Petrolite Corporation, St Louis Mo.; Ethox Chemicals Inc. Greenville S.C.; Rhone-Poulenc, Cranbury N.J. and Borg-Warner Corporation, Chicago Ill.

The alkali metal hydroxide can comprise lithium, sodium, potassium and the like. Preferably, the alkali metal is potassium. The alkali metal hydroxide is admixed with the alkyl orthophosphate ester as a solution in an amount sufficient to at least partially neutralize the ester. The alkali metal hydroxide is admixed with the ester in an amount of from about 5 to about 30% by weight. The alkali metal hydroxide is admixed with the ester in an amount sufficient to adjust the pH of the final two component mixture of gelling agent in the hydrocarbon to a level of from about 3.5 to about 6.5.

The pH of the gelled hydrocarbon mixture is determined by ASTM STANDARD D664-81.

The second component of the gelling agent is prepared by reacting a soluble source of aluminum or ferric ions or an admixture thereof, such as aluminum chloride or ferric sulfate, with a $C_8$–C18 surface active amine in the presence of a organic solvent such as a and a $C_2$–$C_4$ monohydric alcohol.

The $C_{8-18}$ surface active amine employed in the second component is defined herein to include $C_{8-18}$ alkyl and alkanol amines, $C_{8-18}$ alkyl substituted derivatives of N-heterocyclics and mixtures thereof. Preferably, amines having more than 1 nitrogen group are utilized and most preferably the amine comprises an imidazoline such as that prepared from the reaction of a tall oil fatty acid with diethylenetriamine.

The organic solvent preferably comprises a $C_2$–$C_4$ monohydric alcohol, however, other similar compounds also may be used, such as benzene, toluene and xylene. The monohydric alcohol preferably comprises isopropanol, however, ethanol or butanol also can be utilized as well as mixtures of the above. The alcohol functions to solubilize the reaction product resulting from reaction of the constituents. It should be understood that acetone or any other water miscible organic solvent capable of solubilizing the reactant product, also could be utilized to solubilize the mixture.

The source of aluminum or ferric ions is admixed with the alcohol in an amount of from about 10 to about 25% by weight. The amine is admixed with the alcohol in an amount of from about 30 to about 70% by weight. Preferably, the ion source is present in an amount of from about 80 to about 90% and the amine is present in an amount of from about 50 to about 60% by weight of the alcohol or solvent. The reaction may be effected at temperatures of from about ambient to the boiling point of the solvent, or above, if the reaction is effected under superatmospheric pressure.

The first component is admixed with the second component in the hydrocarbon liquid in a ratio of from about 1:0.75 to about 1:1.75 by volume. Preferably, the first component is admixed with the second component in a ratio of from about 1:0.75 to about 1:1.25.

The first component and second component may be admixed with the hydrocarbon liquid in any order or substantially simultaneously so long as the first and second component remain unmixed until substantially in contact with the hydrocarbon liquid. The admixing may occur in substantially any of the conventionally known mixing apparatus or blenders. The total amount of the first and second components used to viscosify a hydrocarbon generally is in a range of from about 3 to 20 gallons per 1000 gallons of hydrocarbon.

Surprisingly, it has been found that the method of the present invention can effect gelation of the hydrocarbon in a matter of a few seconds after both components have been added to the hydrocarbon. The hydrocarbon typically develops a viscosity in excess of about 4000 centipoise within about 30 seconds after admixing with the gelling system as determined on a Brookfield® Model LTV viscometer utilizing a No. 3 spindle rotating at 12 rpm at ambient temperature at a concentration of 0.5% volume. It should be understood that the novel constituents of the present invention also can be utilized to prepare viscosified hydrocarbon fluids in batch processes in addition to the substantially continuous process described herein. The techniques required for batch processing are well known to individuals of any skill in the art.

In an alternate method of effecting viscosification of a hydrocarbon liquid, the alkyl orthophosphate acid ester and alkali metal hydroxide solution are individually admixed with the hydrocarbon liquid together with the product resulting from the reaction of the source of aluminum or ferric ions with the surface active amine in the organic solvent. The alkyl orthophosphate acid ester and alkali metal hydroxide solution are admixed with the hydrocarbon liquid in an amount sufficient to correspond to the ratio set forth above when admixed with the second component reaction product. The ester and hydroxide may be added simultaneously, sequentially in any order or simultaneously or sequentially in any order with the reaction product of the second component to the hydrocarbon liquid.

The gelled hydrocarbon can be admixed with any, of the conventionally known proppants, such as, sand, sintered bauxite, ceramic spheres and the like. The proppants may be present in an amount of from less than 1 pound to in excess of 20 pounds per gallon of gelled hydrocarbons.

The gelled hydrocarbon also may contain substantially any of the conventionally known breakers for gelled oils to return the viscosity of the hydrocarbon liquid to a level at least 50 percent less than its gelled viscosity at the conclusion of the treatment. Examples of breakers include various organic acids such as acetic or benzoic acids, salts of such acids, ammonium carbonate or bicarbonate, other alkali metal carbonates or fluorides, organic acid anhydrides and esters and the like. The amount of breaker employed will vary depending on such parameters as the temperature of the gelled fluid at the time breaking is desired, original viscosity of the gelled fluid, exact salt and orthophosphate esters employed, the concentration of the orthophosphate ester and the like. Generally an effective amount of breaker may range from about 5 pounds to about 100 pounds per 1000 gallons of the gelled fluid.

Other types of fracturing fluid additives such as surfactants, corrosion inhibitors, scale inhibitors and the like well known in the art also can be added to the gelled hydrocarbon fluid.

After thorough blending of the proppant and any other additives with the gelled hydrocarbon fluid, the gel is pumped into a wellbore where it is ultimately caused to enter the subterranean formation which is to be treated. The gelled fluid is pumped at a sufficient rate and pressure to effect a fracture and propagate the same in the subterranean formation. Upon completion of the desired treatment, injection of the gelled hydrocarbon is discontinued and the well is shut-in for a sufficient time to permit the formation to at least begin to close upon the proppant to thereby retain the proppant within the created fracture and create a propped flow passage for subsequent hydrocarbon production.

To further illustrate the present invention and not by way of limitation, the following examples are provided.

EXAMPLE I

To demonstrate the formation of the reaction product between a soluble source of aluminum and an amine the following test was performed.

In a dry box, 6.65 grams of aluminum chloride was weighed and placed in a round bottom three neck flask. The flask then was placed in a set-up wherein an addition funnel is connected to one neck, a stirring apparatus is inserted through the second neck and a condenser and caustic trap was connected to the third neck. While continuously purging with nitrogen to prevent anhydrous aluminum chloride from reacting with moisture, an amine solution comprising 9.25 grams of dodecylamine and 45 grams of benzene was introduced into the flask. The solution was added dropwise over 15 minutes while a nitrogen gas blanket was maintained in the flask. Following the addition, the funnel was flushed with an additional 30 grams of benzene. The reactants were heated at 80° C. for 1.5 hours while stirring. A clear solution was observed to form in the flask. The benzene then was distilled and removed from the product over a 20 minute period. The product then was submitted for IR-Spectra analysis along with an unreacted sample of the amine. Comparison of the Spectra with the published IR-Spectra of The Aldrich Library of FT-IR Spectra, Edition I confirms the identity of the dodecylamine and confirms the existence of a reaction product formed between the aluminum compound and the amine. The Spectra are set forth as FIGS. 1, 2 and 3.

EXAMPLE II

The gelation rate of kerosene by the compositions of the present invention is compared to that achieved by prior art compositions. The gelation rate is evaluated by the time required to effect vortex closure in a quantity of kerosene within a Waring Blendor. The Waring Blendor jar is provided with a Polytron Rotor Stator, Waring Blendor attachment and 250 ml. of kerosene is placed in the jar for each test. The speed of the blender is adjusted to the maximum agitation that could be achieved while minimizing air entrainment which is approximately 3450 rpm. The same speed setting is used for all tests. The quantities of the constituents are set forth in the table below. The phosphate ester first component is added to the jar followed immediately by the second component. The second component was prepared using either aluminum or ferric ion sources as set forth below.

The composition of the components was as follows:

| First Component: | |
|---|---|
| $C_8$–$C_{18}$ orthophosphate di-ester | 15 gm |
| 45% KOH | 4.5 gm |
| Second Component: when Al used | |
| 32° Baume $AlCl_3$ | 50 gm |
| imidazoline | 12 gm |
| isopropyl alcohol | 10 gm |
| Second Component: when Fe used | |
| ferric sulfate liquid (10% $Fe^3$) | 50 gm |
| imidazoline | 12 gm |
| water | 5 gm |
| isopropyl alcohol | 10 gm |

The prior art composition comprised the following:
First Component—$C_8$–$C_{10}$ orthophosphate di-ester
Second Component—sodium aluminate solution (20% by weight $Na_2Al_2O_4$). This composition corresponds to the conventional gellants disclosed on page 60 of the American Chemical Society Symposium Series 396 entitled "Oilfield Chemistry," copyright 1989. The composition is utilized at a concentration to provide the ratio of 100 moles of ester to 33 moles of aluminate described in the ACS publication.

TABLE I

| Test No. | Concentration, gallon, First Component | 1000 gal Hydrocarbon Second Component | | Vortex Close Time, Seconds |
|---|---|---|---|---|
| | | Al | Fe | |
| 1 | 8 | 6 | | 25 |
| 2 | 8 | 8 | | 6 |
| 3 | 8 | | 6 | 12 |
| 4 | 8 | | 8 | 10 |
| 5* | 8 | 2.5 | | >120 |

*prior art composition

The data set forth above clearly illustrates the rapid rate at which the compositions of the present invention achieve gelation of a hydrocarbon liquid in comparison to prior art techniques.

EXAMPLE III

The following tests were performed to evaluate the effects of not producing the reaction product of the second component as taught by Applicants prior to addition to a hydrocarbon liquid upon hydrocarbon viscosification and the general effects of mixing order of the constituents upon viscosification of a hydrocarbon.

In each test, 500 ml of kerosene was placed in a Waring Blendor jar and the speed was adjusted to create a vortex and provide good agitation. The components were added to the jar in the sequence of phosphate ester, second component reaction product or individual constituents and alkali metal hydroxide solution unless otherwise indicated and a stopwatch started while the fluid was observed for gelation. After 5 minutes of mixing, the viscosity was measured at 300 rpm using the Model 35 VG viscometer having a R1B1 rotor and Bob and Number 1 Spring. The fluid was returned to the jar and mixing continued for a total of 15 minutes at which time the viscosity was measured as previously described. The fluid then was transferred to a container, sealed and permitted to sit overnight at which time the viscosity was again measured. The results of the tests are set forth below in Table II.

TABLE II

| Test No. | Kerosene (ml) | Phosphate ester (ml) | 25% KOH | Amine | $AlCl_3$ | IPA | 5 Min. cP | 15 Min. cP | Overnight cP |
|---|---|---|---|---|---|---|---|---|---|
| 1 | 500 | 1.5 | 0.46 | *0.34 | *1.38 | *0.28 | 45[a] | —[c] | —[c] |
| 2 | 500 | 1.5 | 0.33 | *0.34 | *1.38 | *0.28 | 31[b] | 42 | —[c] |
| 3 | 500 | 1.5 | 0 | *0.34 | *1.38 | *0.28 | 12 | 13 | 15 |
| 4 | 500 | 1.5 | 0.46 | **0.34 | **1.38 | 0 | 18 | 15 | — |
| 5 | 500 | 1.5 | 0.33 | **0.34 | **1.38 | 0 | 24 | 26 | — |
| 6 | 500 | 1.5 | 0 | **0.34 | **1.38 | 0 | 12 | 14 | 15 |

TABLE II-continued

| Test No. | Kerosene (ml) | Phosphate ester (ml) | 25% KOH | Amine | AlCl₃ | IPA | 5 Min. cP | 15 Min. cP | Overnight cP |
|---|---|---|---|---|---|---|---|---|---|
| 7 | 500 | 1.5 | 0 | 0.34 | 1.38 | 0 | 4 | 6 | 13 |
| 8 | 500 | 1.5 | 0.33 | 0.34 | 1.38 | 0.28 | 13 | 32 | 48 |
| 9 | 500 | 1.5 | 0.33 | **0.34 | **1.38 | 0.28 | 22 | 24 | 21 |
| 10 | 500 | 1.5 | 0 | **0.34 | **1.38 | 0.28 | 15 | 17 | — |
| 11 | 500 | 1.5 | 0 | 0.34 | 1.38 | 0.28 | 6 | 9 | 14 |
| 12 | 500 | 1.5 | 0.46 | 0.34 | 1.38 | 0 | 3 | 3 | 9 |
| 13 | 500 | 1.5 | 0.46 | 0.34 | 1.38 | 0.28 | 3 | 3 | 17 |
| 14 | 500 | †1.5 | †0.46 | *0.34 | *1.38 | *0.28 | 45ᵈ | 50 | —ᶜ |
| 15 | 500 | †1.5 | †0.33 | *0.34 | *1.38 | *0.28 | 28ᵉ | 31 | –C |

†: Phosphate ester and KOH solution premixed prior to addition to kerosene and added before addition of reaction product to kerosene
*: 3 constituents premixed to form solubilized reaction product in accordance with present patent application then added to kerosene
**: 2 constituents premixed prior to addition to kerosene (viscous semi-solid)
ᵃviscosity measured after 20 seconds of mixing
ᵇviscosity measured after 45 seconds of mixing
ᶜviscosity exceeded measurement capability of viscometer
ᵈviscosity measured 40 cp at 30 seconds
ᵉviscosity measured 25 cp at 30 seconds
Phosphate ester: $C_8$–$C_{18}$ orthophosphate di-ester from Ethox chemicals Inc.
Amine: Witcamine 209 from Witco Chemicals
AlCl₃: 32 baume aluminum chloride solution
IPA: 2-propanol
KOH: potassium hydroxide solution (25%)

The foregoing tests results clearly demonstrate the superior rapid viscosification achieved by the method of the present invention in comparison to all variations of such method wherein constituents are left out or not added in accordance with the method of applicants invention. This is evidenced by a comparison of, for example, the method of the present invention used in Tests 1, 2, 14 and 15 to Tests 8 and 13 which did not use the method of the present invention but used the exact same constituents in the same concentrations and were individually added to the kerosene. The present method achieved significant viscosity in less than 45 seconds in Tests 1 and 2 whereas Tests 8 and 13 showed little viscosity development after 5 minutes. Similar comparisons can be made between Tests 1, 2, 14 and 15 and Tests 3–7 and 9–12 in which various constituents were left out or different mixing orders were employed. Each test failed to develop any significant viscosity within 5 minutes in the kerosene in comparison to the method of the present invention.

EXAMPLE IV

The composition and method of the present invention is compared to a conventional aluminum phosphate salt gelling of the type described in U.S. Pat. No. 5,110,485. In accordance with Example 5 of U.S. Pat. No. 5,110,485 an aluminum phosphate gelling agent was prepared. A 4-neck reaction flask was used equipped with a thermometer, mechanical stirrer, condenser and N₂ gas inlet. In the flask, 43.44 grams of aluminum sulfate hydrate and 100 grams of toluene were added to 100 grams of dialkyl phosphate. The mixture was heated for 2 hours at 98°–106° C. An amber colored transparent liquid was formed and approximately 18 ml of water was azerotroped from the mixture. The solution was allowed to cool and then was transferred to a sealed container. The aluminum phosphate gelling agent then was activated with a 50% (volume) IPA/triethanolamine solution when added to kerosene in accordance with Examples 7 and 8 of U.S. Pat. No. 5,110,485. Specifically, 250 ml of kerosene was placed in a Waring Blendor jar. The speed of the blender was adjusted to create a vortex in the kerosene and provide good agitation. An aliquot equivalent to 10 gal/1000 gal kerosene of the gelling agent was placed in the blendor. The activator described in Examples 7 and 8 of the patent then was added to the mixture and the fluid was observed for gelation. The optimum amount of activator used by patentee is not set forth in the Examples or specification, therefore several visual tests were performed to examine whether an optimum ratio existed. The amount of activator was varied over several tests from the equivalent of 0.8 gal/1000 gal to 8 gal/1000 gal of kerosene. A good gel was visually obtained when the equivalent of 4–6 gallon of the activator per 1000 gallon of kerosene was employed. The quickness of the hydrocarbon gelation was then evaluated in several tests by placing 250 ml of kerosene in a Waring Blendor jar for each test. The blendor speed was set at 3450 rpm. The aluminum salt gelling agent prepared in accordance with Example 5, of U.S. Pat. No. 5,110,485 was added to the kerosene at a concentration equivalent to 10 gal/1000 gal of kerosene. Then the activator (50% by volume IPA/triethanolamine) was added to kerosene samples at a concentration of 2, 4, 6 and 7 gal/1000 gal of kerosene. A stopwatch was started upon addition of the activator and the time for the fluid to become viscous and the vortex to close, creating a static fluid on the surface (defined as the vortex close time), was measured. If the vortex failed to close after 5 minutes, the fluid was transferred to a Model 35 Fann VG viscometer operated at 300 rpm having a R1B1 rotor and Bob and Number 1 spring. The results of the tests are set forth in the table III below:

TABLE III

| Test No. | Kerosene (ml) | Aluminum Phosphate salt (ml) | IPA/TEA (ml) | 5 Minutes cP | Vortex Close, Time, Minutes |
|---|---|---|---|---|---|
| 1 | 250 | 2.5 | 0.5 | 4 | >5 |
| 2 | 250 | 2.5 | 1.0 | 23 | >5 |
| 3 | 250 | 2.5 | 1.5 | 14 | >5 |

TABLE III-continued

| Test No. | Kerosene (ml) | Aluminum Phosphate salt (ml) | IPA/TEA (ml) | 5 Minutes cP | Vortex Close, Time, Minutes |
|---|---|---|---|---|---|
| 4 | 250 | 2.5 | 1.75 | 4 | >5 |

To determine whether heating the reactants in the method of Example 5 of U.S. Pat. No. 5,110,485 effects the formation of the aluminum phosphate salt, the following further tests were performed. In a container 4,344 grams of aluminum sulfate hydrate and 10.0 grams of toluene were added to 10.0 grams of dialkyl phosphate. The reactants were mixed for a period of time and thereafter sealed in a container and allowed to sit at room temperature for 19 hours. The fluid was clear and the aluminum sulfate hydrate had settled to the bottom of the container after settling for 19 hours. This mixture was thoroughly stirred and the equivalent of 10 gal of the mixture/1000 gal of kerosene was added to 250 ml of kerosene in a Waring Blendor jar as described above in tests with activator present in the amount of 4, 6 and 7 gal/1000 gal of kerosene. The vortex close time was measured as described above and the results are set forth below in Table IV. No gelation was observed to occur in any of these samples.

TABLE IV

| Test No. | Kerosene (ml) | Aluminum Phosphate Salt Mixture (ml) | IPA/TEA (ml) | 5 Minutes cP | Vortex Close Time, Minutes |
|---|---|---|---|---|---|
| 5 | 250 | 2.5 | 1.0 | 3 | >5 |
| 6 | 250 | 2.5 | 1.5 | 3 | >5 |
| 7 | 250 | 2.5 | 1.75 | 3 | >5 |

The results of tests 1–7 then were compared to a gel prepared using the procedure described in the present Application. The equivalent of 5 gal/1000 gal of kerosene of the first component comprising phosphate ester with potassium hydroxide and 5 gal/1000 gal of kerosene of the second component comprising the reaction product resulting from the reaction of aluminum chloride with the amine in IPA prepared in accordance with the method of the present Application (total equivalent to 10 gal/1000 gal of kerosene) are added to a 250 ml sample of kerosene in a Waring Blendor jar set at a speed of 3450 rpm. The vortex close time was measured and as soon as vortex closure occurred the fluid was transferred to the described Model 35 Fann VG viscometer for measurements at 300 rpm. The results are set forth in the Table V below:

TABLE V

| Test No. | Kerosene (ml) | First Component (ml) | Second Component (ml) | Vortex Close Time, Seconds | Viscosity cP |
|---|---|---|---|---|---|
| 8 | 250 | 1.25 | 1.25 | 12 | 50 |

As indicated, vortex closure occurred in 12 seconds and the fluid had a viscosity of 50 cP, by way of contrast, none of the samples tested using the gelling agent of U.S. Pat. No. 5,110,485 demonstrated a vortex closure of less than 5 minutes (300 seconds) and none had a 5 minute viscosity even approaching 50 cP.

As will be apparent to those skilled in the art, various changes may be made in the compositions and methods described herein without departing from the spirit or scope of the invention set forth in the appended claims.

What is claimed is:

1. A method of treating a subterranean formation penetrated by a wellbore comprising:

mixing a liquid hydrocarbon with a viscosifying effective amount of an admixture of an alkyl orthophosphate acid ester and an alkali metal hydroxide whereby said ester is at least partially neutralized by said alkali metal hydroxide and the reaction product of a water soluble source of aluminum or ferric ions and a $C_8$–$C_{18}$ surface active amine in the presence of an organic solvent, whereby said mixture is caused to viscosify, said admixture of said alkyl orthophosphate acid ester and said alkali metal hydroxide and said reaction product of said water soluble source of aluminum or ferric ions and said $C_8$–$C_{18}$ surface active amine being unmixed until in contact with said liquid hydrocarbon.

2. The method of claim 1 defined further to include the step of mixing a propping agent with said viscosified mixture.

3. The method of claim 1 wherein said alkali metal hydroxide is potassium hydroxide and said surface active amine is imidazoline.

4. The method of claim 1 wherein said alkyl orthophosphate acid ester and alkali metal hydroxide is admixed with said reaction product of said water soluble sources of aluminum or ferric ions and said $C_8$ $C_{18}$ surface active amine in a ratio of from about 1:0.75 to about 1:1.75.

5. The method of claim 1 wherein the total amount of said alkyl orthophosphate acid ester, alkali metal hydroxide and reaction product of said water soluble source of aluminum or ferric ions and said $C_8$–$C^{18}$ surface active amine admixed with said liquid hydrocarbon is in the range of from about 3 to about 20 gallons per 1000 gallons of said hydrocarbon.

6. A method of treating a subterranean formation penetrated by a wellbore comprising:

mixing a liquid hydrocarbon with a viscosifying effective amount of an alkyl orthophosphate acid ester, an aqueous solution of an alkali metal hydroxide and a reaction product resulting from the reaction of a water soluble source of aluminum or ferric ions and a $C_8$–$C_{18}$ surface active amine in the presence of a water miscible organic solvent whereby said hydrocarbon liquid is caused to viscosify, said alkyl orthophosphate acid ester and alkali metal hydroxide being unmixed with said reaction product of said water soluble source of aluminum or ferric ions and said $C_8$–$C_{18}$ surface active amine until the same are in contact with said hydrocarbon liquid.

7. A method of rapidly viscosifying a liquid hydrocarbon comprising:

mixing said liquid hydrocarbon with an effective viscosifying amount of a first component comprising an admixture of an orthophosphate ester having the general formula $$\begin{array}{c} \text{O} \\ \| \\ \text{RO}-\text{P}-\text{OR}_1 \\ | \\ \text{OH} \end{array}$$

wherein R is $C_6$ to $C_{18}$ and $R_1$ is an alkyl radical of from $C_2$–$C_4$ and an alkali metal hydroxide and a second component comprising the reaction product of a soluble source of

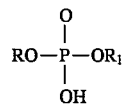

aluminum or ferric ions and a $C_8$–$C_{18}$ surface active amine in the presence of a $C_2$–$C_4$ monohydric alcohol whereby said mixture is caused to rapidly viscosify and achieve a viscosity of at least about 4000 cp in less than 30 seconds as measured by a Brookfield Synchrolectric viscometer Model LTV using a #3 Spindle rotating at 12 rpm at ambient temperature when said first and second component are at a concentration of 0.5% by volume of said liquid hydrocarbon, said first and said second component being unmixed until substantially in contact with said liquid hydrocarbon.

8. The method of claim 7 wherein R of said first component has an average value of from about 8 to 10 and $R_1$ is ethyl.

9. The method of claim 7 wherein said alkali metal hydroxide is potassium hydroxide.

10. The method of claim 7 wherein said source of aluminum ions comprises aluminum chloride.

11. The method of claim 7 wherein said $C_8$–$C_{18}$ surface active amine comprises at least one member selected from the group of $C_8$–$C_{18}$ alkyl or alkanol amines, N-heterocyclic amines and alkyl substituted derivatives of such heterocyclic amines.

12. The method of claim 7 wherein said first component is admixed with said second component in a ratio of from about 1:0.75 to about 1:1.75.

13. The method of claim 7 wherein said mixture of first and second component is present in said liquid hydrocarbon in an amount of from about 3 to about 20 gallons per 1000 gallons.

14. The method of claim 7 wherein said alkali metal hydroxide is present in said first component in an amount sufficient to adjust the pH of said gelled hydrocarbon to a level in the range of from about 3.5 to 6.5.

15. The method of claim 7 wherein said source of aluminum or ferric ions is admixed with said alcohol in an amount of from about 10 to about 25% by weight.

16. The method of claim 7 wherein said surface active amine is admixed with said alcohol in an amount of from about 30 to about 70% by weight.

17. The method of claim 7 wherein said alkali metal hydroxide is admixed with said ester in an amount of from about 5 to about 30% by weight.

18. The method of claim 7 wherein said source of ferric ions is iron sulfate.

19. The method of claim 7 wherein said surface active amine is imidazoline.

20. The method of claim 19 wherein said imidazoline is prepared from the reaction of a tall oil fatty acid with diethylenetriamine.

* * * * *